Nov. 20, 1962

J. M. HART 3,065,421

RADIO-TELEPHONE COMMUNICATION SYSTEM HAVING MEANS FOR AUTOMATIC DIRECT DISPATCH BETWEEN MOBILE STATIONS

Filed May 21, 1957

5 Sheets-Sheet 1

INVENTOR

JOHN M. HART

BY *Marzall, Johnston, Cook & Root*

ATTORNEYS

INVENTOR
JOHN M. HART
BY
Marzall, Johnston, Cook & Root
ATTORNEYS

Nov. 20, 1962 J. M. HART 3,065,421

RADIO-TELEPHONE COMMUNICATION SYSTEM HAVING MEANS FOR AUTOMATIC DIRECT DISPATCH BETWEEN MOBILE STATIONS

Filed May 21, 1957 5 Sheets-Sheet 3

INVENTOR

JOHN M. HART

BY Marzall, Johnston, Cook & Root

ATTORNEYS

Nov. 20, 1962 J. M. HART 3,065,421

RADIO-TELEPHONE COMMUNICATION SYSTEM HAVING MEANS FOR AUTOMATIC DIRECT DISPATCH BETWEEN MOBILE STATIONS

Filed May 21, 1957 5 Sheets-Sheet 4

INVENTOR
JOHN M. HART
BY Marzall, Johnston, Cook & Root
ATTORNEYS

INVENTOR
JOHN M. HART
BY
Marzall, Johnston, Cook & Root
ATTORNEYS

United States Patent Office 3,065,421

Patented Nov. 20, 1962

3,065,421

RADIO-TELEPHONE COMMUNICATION SYSTEM HAVING MEANS FOR AUTOMATIC DIRECT DISPATCH BETWEEN MOBILE STATIONS

John M. Hart, 1111 State Road 67 E., Anderson, Ind.

Filed May 21, 1957, Ser. No. 660,652

9 Claims. (Cl. 325—55)

Figure 1:
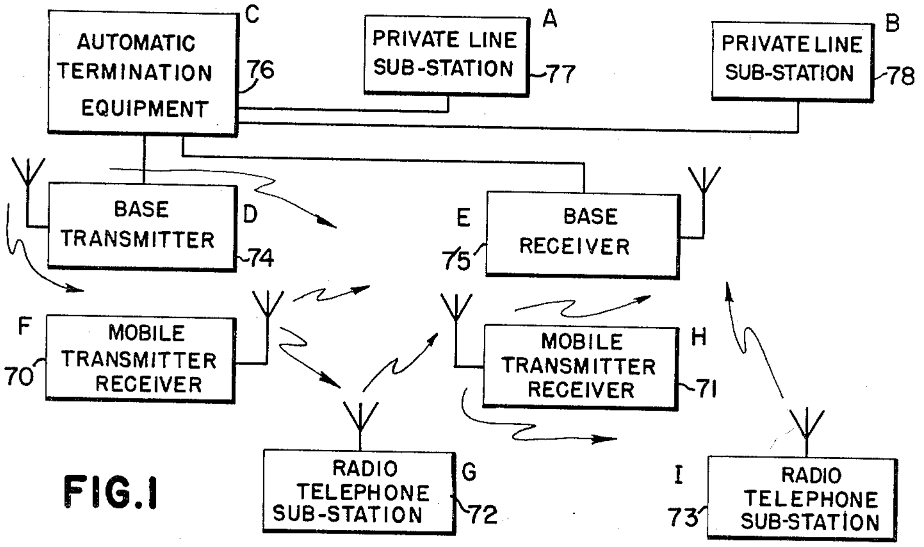

This invention relates in general to a direct dispatch system for communication purposes, and more particularly to automatic radio-telephone systems, and still more particularly to a fully automatic mobile radio-telephone exchange employed in a mobile communication system.

The automatic mobile radio-telephone exchange of the present invention performs without requiring the attendance of operators, wherein fully automatic signalling and control and two-way conversation may be provided between any private line dispatch point and a mobile unit or a radio-telephone unit, between mobile units or between mobile units and radio-telephone units.

A radio-telephone unit or sub-station may be defined as any radio-telephone station which is designed to be employed in connection with the system of the present invention whether it is in the same town or other adjacent communities. This system is not limited to any given number of mobile units, dispatch points or radio telephone stations, although it will be hereinafter illustrated, for simplification purposes, as a ten station ten mobile unit system.

To place a call from any one of the private line dispatch points to a mobile or radio-telephone unit, remove the receiver from the hook. If the channel is busy, an interrupted tone is heard, so the operator would then replace the receiver on the hook. If the channel is clear, a steady tone of a different pitch will be heard and the operator can then commence dialing. The dialing will be sent through automatic termination equipment which, in turn, transmits signals to the mobile and radio-telephone units. Only the unit being dialed will be signalled by a light and buzzer which will operate to notify the recipient of the call, and possibly even a horn if the unit is in a vehicle. Removal of the receiver from the hook by the recipient turns off the light, buzzer and horn or other signalling apparatus. Two-way conversation may then be carried on in the usual push-to-talk fashion. Upon completion of the conversation, the termination equipment will be reset to normal when the receiver at the private line dispatch point is replaced on the hook.

To place a call from any mobile or radio-telephone to anyone of the private line sub-stations or dispatch point, the operator checks to see if the channel is clear. He then pushes his push-to-talk switch and dials the number of the dispatch point, e.g. 230. Upon release of the push-to-talk switch, a ring back signal will be heard which signals the dispatch point. When the party at the dispatch point answers, two-way conversation may begin. At the conclusion of the conversation, replacing of the receiver on the hook at the dispatch point resets the equipment to normal.

In placing a call from one mobile or radio-telephone unit to another mobile or radio-telephone unit, the operator checks to see if the channel is clear and then commences the dialing operation with the push-to-talk switch actuated. For example, to call car #455, one would dial 655 and upon answering by car #455, conversation could begin in the conventional push-to-talk manner. Upon completion of the call, the equipment will automatically reset to normal.

Accordingly, it is an object of this invention to provide a fully automatic radio-telephone system adapted for use by the direct dispatch system user or the private radio-telephone system user wherein no attendance of operators is necessary.

Another object of this invention is in the provision of an improved radio-telephone system, wherein signaling and two-way conversation may be accomplished between any two mobile or fixed units through the employment of an automatic radio-telephone exchange system.

Still another object of this invention resides in the provision of an automatic radio-telephone ssytem arranged to prevent the ringing voltage from occasionally ringing the undesired telephone unit at a time when the selectors are stepping up a called number.

A further object of this invention is to provide an automatic radio-telephone exchange system operable in response to a signal from a mobile unit, regardless of whether the mobile unit is in motion, in a fringe area, or supplying a strong radio frequency signal to the base station receiver.

A still further object of this invention is in the provision of an automatic telephone exchange system having a limiter-amplifier stage capable of decoding the incoming keyed tones notwithstanding the fact that the incoming tone signal is not always constant.

Figure 2:
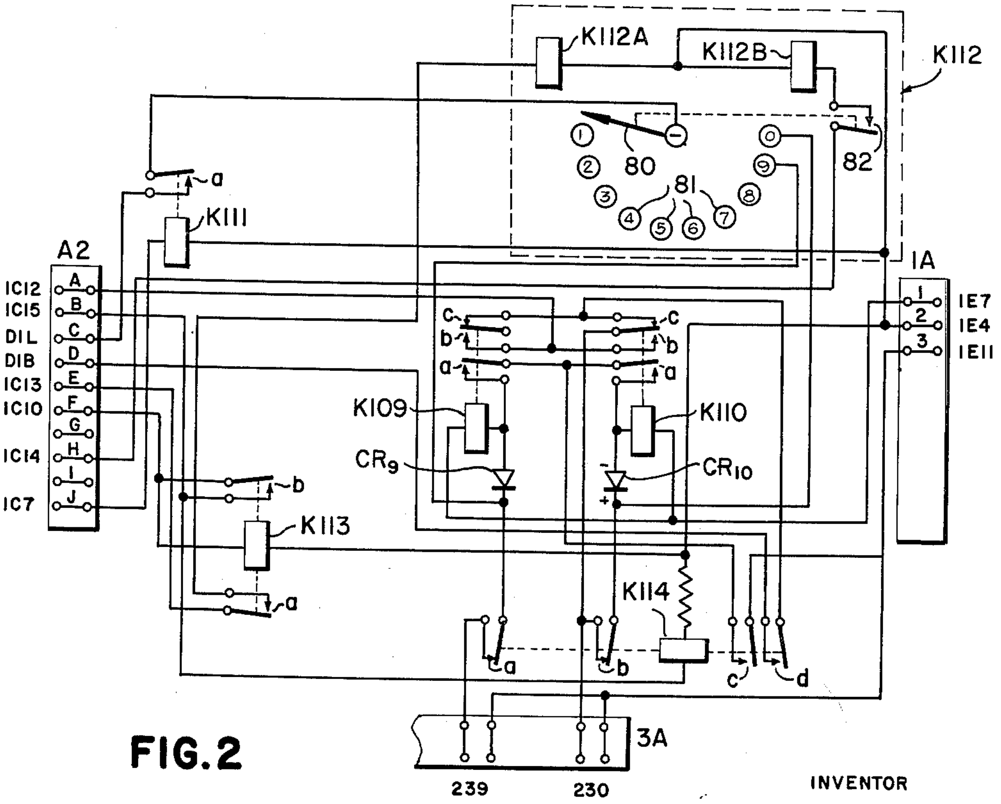
Figure 3:
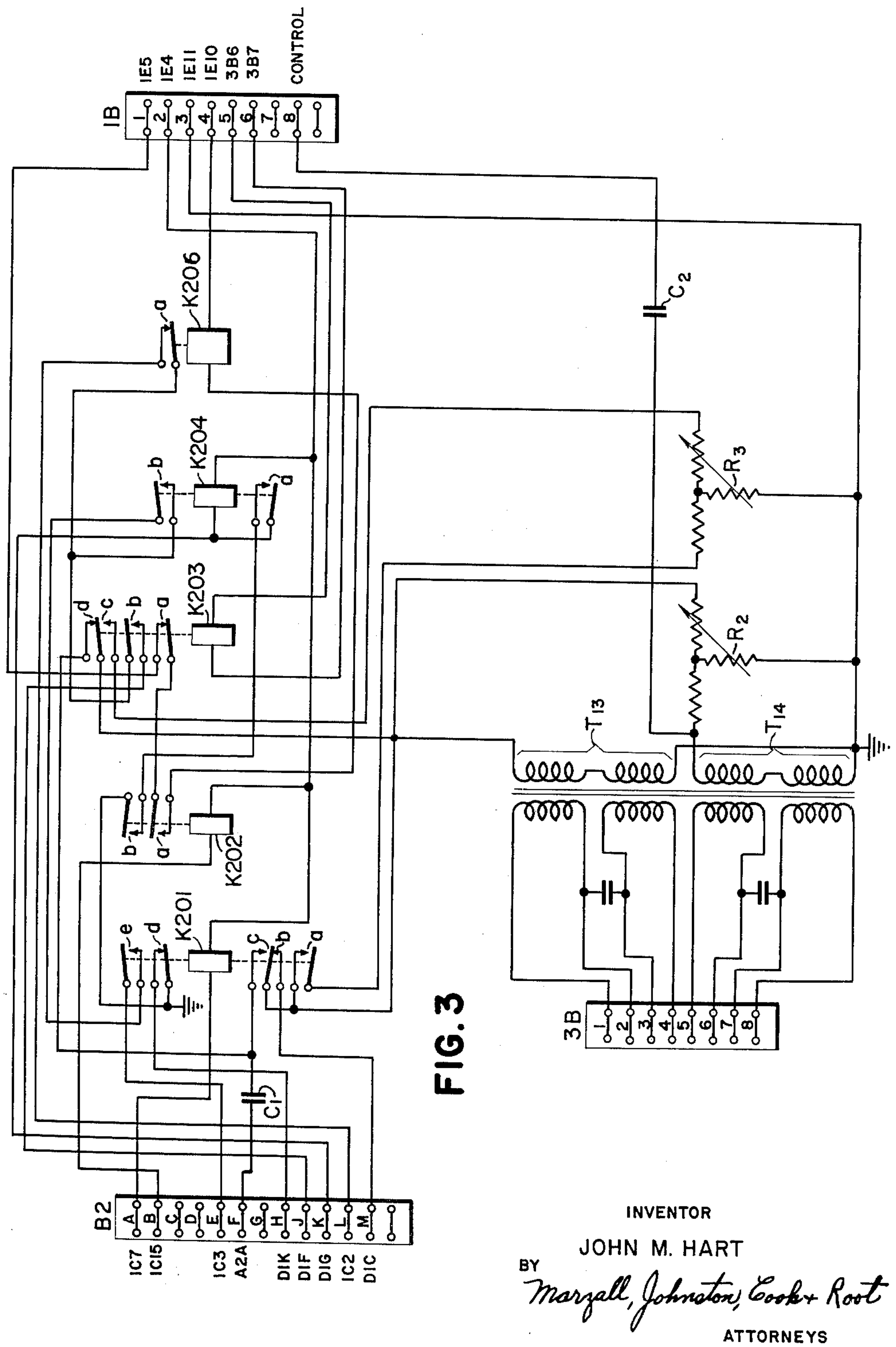
Figure 4:
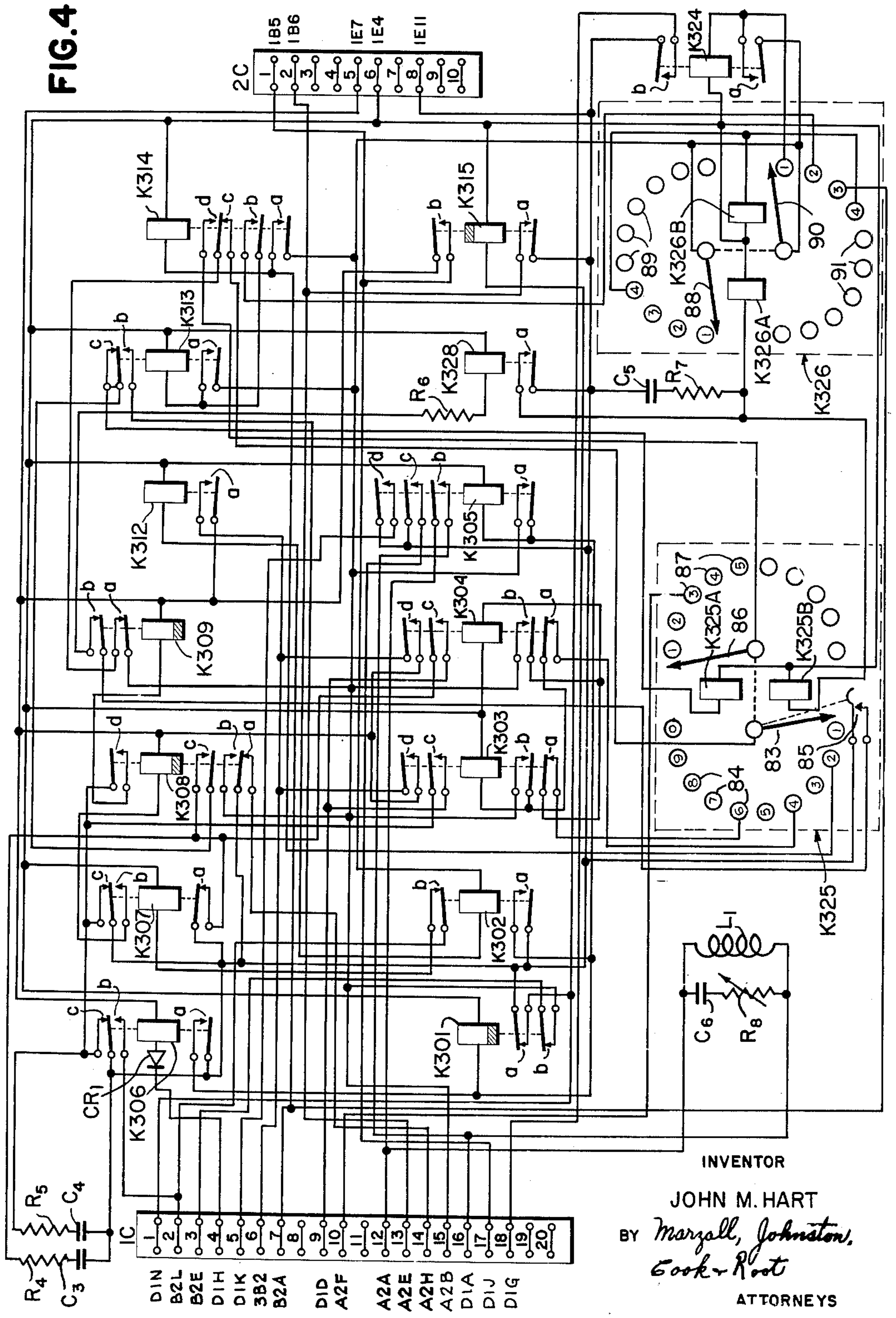
Figure 5:
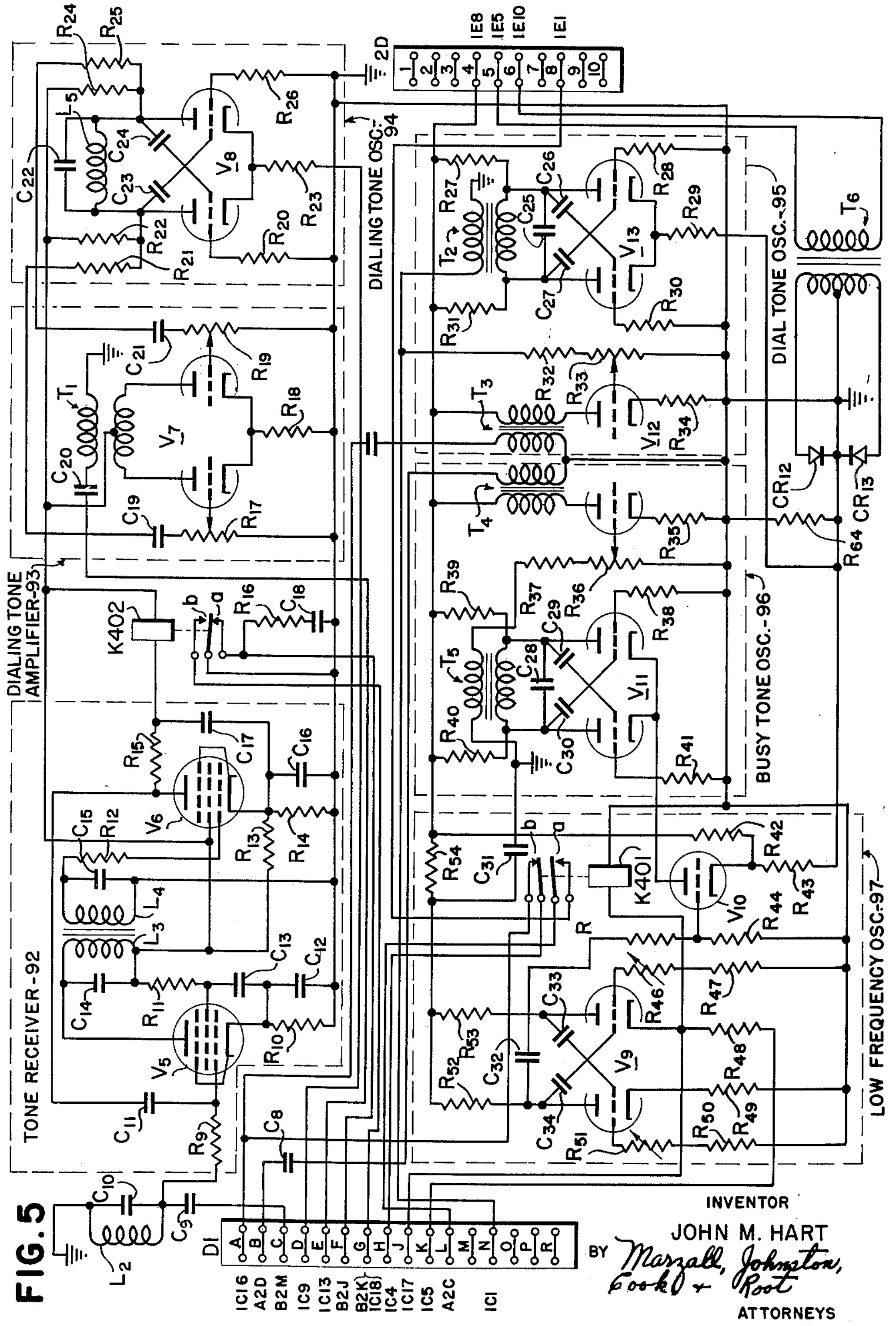
Figure 6:
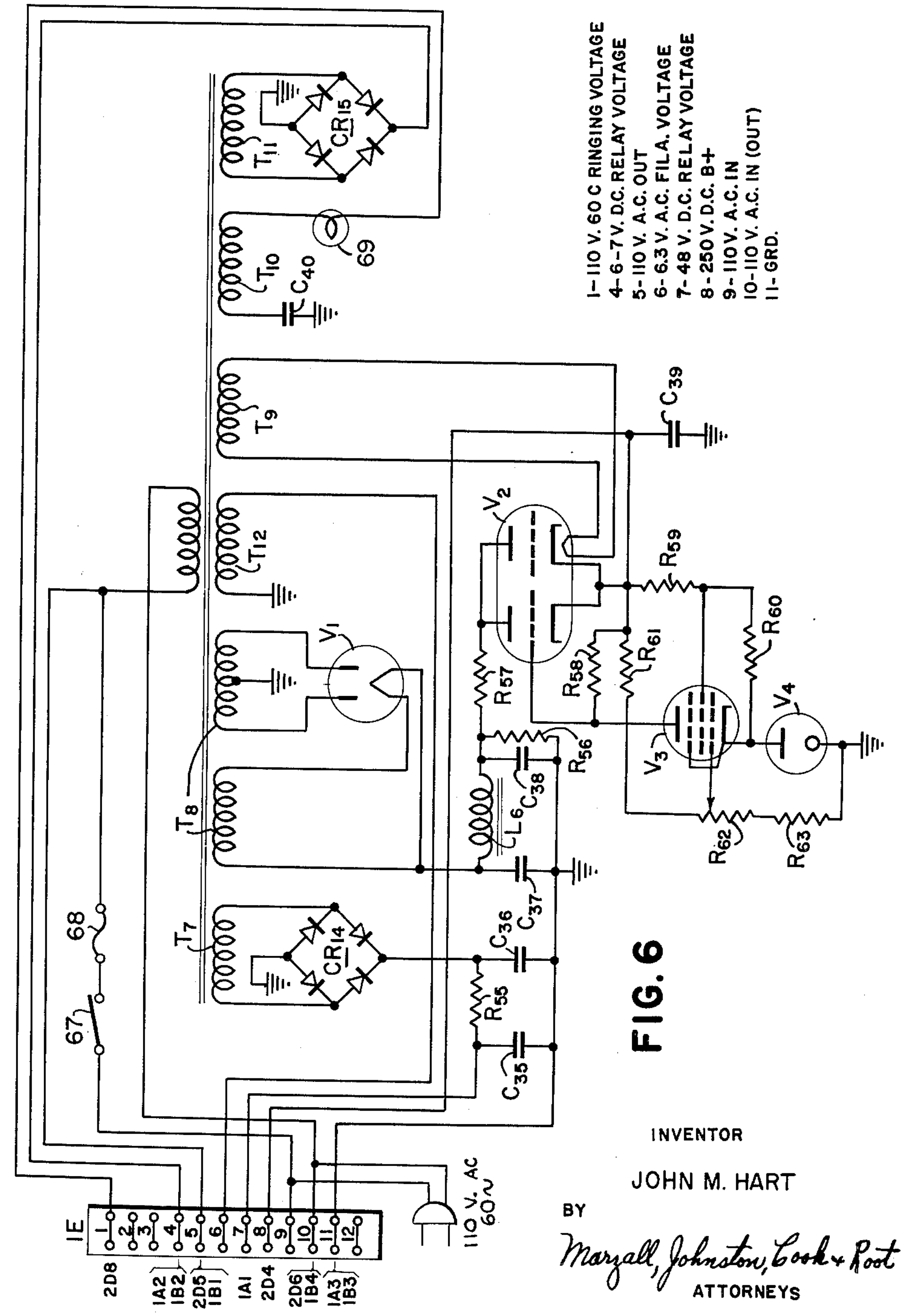

Other objects, features and advantages of the invention will be apparent from the following detailed disclosure taken in conjunction with the accompanying sheets of drawings, wherein like reference numerals refer to like parts, in which:

FIG. 1 is a schematic block diagram of an automatic radio-telephone system embodying the present invention;

FIGS. 2, 3, 4, 5, and 6, taken together, are a schematic circuit diagram of the telephone termination equipment embodying the present invention; wherein FIG. 2 represents the line panel for private lines; FIG. 3 represents generally the termination panel for coupling to the base station transmitter and receiver; FIG. 4 represents generally the control panel which selects and/or rejects the proper calling or receiving digit numbers; FIG. 5 represents generally the panel which either generates or receives the tone signals; and FIG. 6 represents the power supply panel.

Referring particularly to FIG. 1 which illustrates the complete system in block diagram, the system includes mobile transmitter-receivers or units 70 and 71, each located, for example, on an automotive vehicle, ship or the like, and radio-telephone sub-stations or units 72 and 73 each located, for example, at a rural location or at any desirable dispatch point. The radio-telephone units, of course, include transmitter-receiver units as do the mobile units 70 and 71. All of the units 70, 71, 72, and 73 are adapted to receive communications and transmit communications between each other through the single base transmitter 74 and base receiver 75 which, in turn, is coupled to the automatic termination equipment 76. Accordingly, the transmitters of the units 70, 71, 72, and 73 will be tuned to the same frequency as the base station receiver 75 while the receivers of the units will be tuned to the same frequency as the base station transmitter 74 and have the receivers normally "on" and the transmitters normally "off." Similarly the base station receiver 75 will be normally "on," while the base station transmitter will be normally "off." Further, all of the units 70, 71, 72, and 73 are equipped with such automatic equipment that will permit dialing operation between units including a dialing assembly, a press-to-talk telephone unit, a ten position stepping relay or selector signalling means to indicate the unit is being called, etc. The automatic termination equipment 76 is also connected directly to private line sub-stations 77 and 78 which would be located in a private home or business office or the like. While only two private line sub-stations are shown, it will be understood that any number may be used. Similarly, the present radio-telephone system is not limited to any number of mobile or radio-telephone units, although for purposes of clarity, only a ten car ten station system is illustrated in the drawings.

The automatic radio-telephone termination equipment 76 of the present invention is shown in detail in FIGS. 2 to 6 inclusive. This equipment is unattended and serves the purpose of providing automatic signalling and control plus two-way conversation between any of the private substations or mobile units or radio-telephone units, all of which include the necessary dialing equipment and accessories. In the drawings, each relay or switch is shown in its normal or stand-by condition, that is, with no exciting current supplied to the relay coil, the supply of excitation to any relay coil will move the movable relay contacts toward the relay core and will thereby interrupt circuits or make circuits as the case may be.

The power supply employed for the termination equipment of the present invention is taken from the panel 1E as seen in FIG. 6. This power supply circuit includes the necessary power transformers T7, T8, T9, T10, T11, and T12. The panel 1E is provided with twelve terminals, some of which are unused, and 110 volt 60 cycle alternating current is supplied to terminals 9 and 10 which feed through a main switch 67 and an overload device 68 to the primary of the transformers. The power transformer T10 supplies 110 volt 60 cycle alternating current ringing voltage to the terminal 1E1. The condenser C40 is a blocking condenser and the bulb 69 acts as a protective device in case there is a short in the telephone line, wherein the bulb lights up instead of damaging the power transformer T10.

A six volt direct current is supplied from the power transformer T11 and the full wave selenium rectifier CR15. This voltage is utilized by certain relays in the system.

The terminal 1E5 merely provides 110 volt alternating current beyond the overload device or fuse 68.

The power transformer T12 supplies 6.3 volt alternating current to the terminal 1E6 for further supplying to the filaments of all of the vacuum tubes except the tubes V1 and V2. The power transformer T9 supplies the filament voltage to the vacuum tube V2, while filament voltage to the vacuum tube V1 is supplied from part of the power transformer T8.

The transformer T8, vacuum tubes V1, V2, V3, and V4, the capacitors C37, C38 and C39, the inductance L6, and the resistors R56, R57, R58, R61, R59, R60, R62, and R63 cooperate to supply the regulated B-plus voltage to the terminal 1E8 for operation of certain vacuum tubes on the panel for generating and receiving tone signals. The resistor R62 serves to control the amount of B-plus voltage at the terminals 1E8.

The power transformer T7, the selenium rectifier CR14, the capacitors C35 and C36, and the resistor R55 supply 48 volt direct current to the terminal 1E7 for operating certain of the relays in the system. The terminals 1E4 and 1E7 are minus terminals for their respective voltages. The terminal 1E11 is connected to ground for the purposes of providing a convenient return circuit on the panel 1E.

Referring now to FIG. 2 which illustrates the line panel for private lines, and for clarity purposes shows only two line circuits 230 and 239 on the terminal 3A, the terminal panels 3A would for example connect the terminals 230 to the private line sub-station 77, FIG. 1, while the terminals 239 would connect to the private line sub-station 78, FIG. 1. When the telephone receiver is removed from the instrument connected to the terminals 230, a short circuit is placed upon the line causing current to flow from the power supply to the terminal 1A1 of the terminal strip 1A through the line finding relay K110, through the selenium rectifier CR10 which prevents currents in the reversed direction from operating the relay K110, the contacts K114*b* of the relay K114, back through the instrument connected to the terminals 230, and through the terminal 1A3 to the return circuit or ground of the power supply which is the terminal 1E11. The selenium rectifier 10 prevents the A.C. ringing voltage from pulsing the relay K110. The operation of relay K109 and its associated circuit with respect to the terminals 239 would be identical to that of K110 when the operator on the instrument connected to the terminals 239 desires to use that line.

On the panel 1A, terminal 1A1 connects to the minus terminal 1E7 of the 48 volt direct current power supply, terminal 1A2 connects to the minus terminal 1E4 of the six volt direct current power supply, and the terminal 1A3 connects to the return circuit or ground terminal 1E11. On the terminal panel A2, terminal A2A connects to the dial tone oscillator 95, FIG. 5, through the tuned ring-back circuit C6, L1, R8 (FIG. 4) via the terminals 1C12 and 1C16 and D1A but this tuned ring-back circuit is shunted out when the relay K305 (FIG. 4) is energized terminal A2B connects to the return circuit through terminal 1C15 and the contacts K308*b* when relay K308 is energized, terminals A2C connect to the ringing voltage of terminals 1E1 through terminals D1L and 2D8 and the contacts K401*a* when relay K401 is energized, terminals A2D connect to the busy-tone oscillator 96 through the terminals D1B, terminals A2E connect to the contacts K313*a* of the relay K313, FIG. 4, through the terminals 1C13, terminals A2F connect to the third position of the contacts 87 of the selector K325, FIG. 4, through the terminals 1C10, terminals A2H connect to the normally closed contacts K308*a* of the relay K308 via the terminals 1C14 for resetting relay K112B of the selector K112 to normal, and terminals A2K connect to the third position of contacts 91 of the selector or stepping relay K326, FIG. 4.

The relay K111 in FIG. 2 operates after the last number has been dialed and functions to prevent the ringing voltage from occasionally ringing the undesired telephone unit at the time the selector K112 is stepping up to the called number. The relay K113 operates after the second number has been dialed which connects in the third number for stepping up the selector K112 by energizing the motor coil K112A.

The selector stepping relay K112 is provided with the conventional ten contacts, but only the ninth and tenth position contacts 81 are used when the arm 80 makes contact with these contacts. The selector includes a motor coil K112A, whose actuations, as by a pulse of current serve to step the arm 80 to the next position. A release magnet coil K112B is provided whose actuation restores the arm 80 to the "home" position, where the arm 80 operates a limit switch 82 and opens the reset magnet coil circuit.

A lock-out relay K114 imposes the busy signal on all other lines by connecting the busy tone oscillator 96 through the contacts K114*d* through the other lines, and opens the circuit to each line finding relay. The resistor R1 between the relay K114 and the terminals 1A2 serves to make relay K114 slow operating and thereby prevents the dancing of the sequence relay K114, relay K110, relay K114, relay K110, and so on.

The circuitry in FIG. 3 serves generally to connect the base station transmitter and receiver into the system as well as including other automatic equipment. The transformer T13 couples the base station transmitter to the automatic exchange equipment via the terminals 3B1, 3B2, 3B3, and 3B4 on the terminals 3B, while the transformer T14 couples the base station receiver to the automatic exchange equipment through terminals 3B5, 3B6, 3B7, and 3B8 on terminal strip 3B.

The T-pad resistor R2 attenuates the incoming audio signal to the base station receiver, while the T-pad resistor R3 attenuates the audio signal from the base station receiver back to the base station transmitter thereby equalizing the signal with the average incoming signal from the private lines. Between the transformer T14 and the terminals 1B8, a blocking condenser C2 serves to prevent passage of direct current which is sometimes impressed on the terminal 1B8, and also serves to connect the audio signal from the base station receiver to remote points for audio monitoring. Between the terminals B2F and the contacts K201*c* of the relay K201, a condenser C1 serves to block direct current energy as well as to couple the audio to the resistor R2 when the relay K201 is energized. The closed contacts K201*b* connect the tone receiver 92 to the base station transmitter, while closing of normally open contacts K201*a* and K201*c* connect in the base station transmitter and base station receiver to the equipment. This relay K201 operates as a digit counter and only after the last number has been dialed and when the selector arm 90 reaches the third position on the selector K326. The relay K202 operates when the relay K308, FIG. 4, is energized through the relay contacts K308*b*, the terminals 1C15 and the terminals B2B. The closing of the contacts K202*b* energizes the thirty second slow-to-operate timer relay K206 through the contacts K203*a*, the terminals 1B1 and 1E5, the other side of the relay being connected to the terminals 1E10 through the terminals 1B4. The relay contacts K202*b* also serve to hold the relay K204 in energized position when it is operated. This relay K204 then serves as a locking relay. The relay K203 is carrier operated through the terminals 1B5 and 1B6 which are respectively connected to the terminals 3B6 and 3B7 of the base receiver.

Referring now to FIG. 4, this circuitry represents the control panel for selecting or rejecting proper calling or receiving digit numbers, wherein a slow release relay K301 prevents the dispatch points or private line substations from being re-rung and thereby permit the relay K307 to release first. The relay K302 resets the equipment to normal via remote control prior to resetting of the equipment automatically and is operated when relay K315 is operated as will be explained. The relay K303 turns on the base station transmitter and connects in the selective tone for signalling the mobile transmitter receiver being called and also prevents relay K304 from operating by opening the contacts K303*a*. The relay K304 turns on the transmitter, opens up the relay K303 by opening the contacts K304*a* and connects in the signalling tone whenever a mobile or radio-telephone unit dials the number six as the first number to call another car. The base station transmitter is turned on by the closing of contacts K304*d*, while the signalling tone is connected through the contacts K304*c*. Opening of the contacts K304*a* releases the relay K303, while closing of the contacts K304*b* aids in connecting the signal tone when number six is dialed through the selector K325. The relay K305 operates whenever the relay K306 operates and shunts out the L1, C6, R8 tuned ring-back control circuit through the closing of contacts K305*b*. The closing of the contacts K305*c* shorts out the relay K401 while closing of the contacts K305*d* connects ground to the resistor R48.

The resistor R6 at the relay K328 serves to make it a slow-to-release relay for resetting the selector K325 after each dialed digit and stepping up the selector K326. The selector 325 includes a motor or rotating coil 325A whose actuation, by a pulse of current, serves to step an arm 85 to the next position. This arm 85 makes contact with a series of ten contacts 84, of which contacts 2, 4, and 6 are in the circuit.

A second arm 86 is ganged with the arm 83, and similarly with a series of ten contacts 87 of which position No. 3 is connected into the circuit. A release coil K325A is provided which when actuated restores the ganged arms 83 and 86 to the "home" position, where these arms operate a limit switch which opens the release magnet coil circuit. Opening of the limit switch 85 deenergizes the coil K328 to thereby deenergize the reset coil K325B.

Selector K326 similarly has a motor stepping magnet coil K326A, ganged arms 88 and 90, and series of contacts 89 and 91. The relay K324 is operated after the first number has been dialed wherein the arm 90 of the selector K326 engages the number one position of the contacts 91 and this relay serves as a dial tone cut-off relay to stop the dial tone after the first number has been dialed. The contact K324*a* serves to hold the relay K324 in energized position after the arm 90 has stepped beyond the first position of the contacts 91 while the relay contacts K324*b* stops the dial tone oscillator 95.

The relay K306 is the dialing relay for dialing the calling tone and the selenium rectifier CR11 is placed in series with the coil of the relay to prevent the ringing voltage from occasionally operating this relay after a mobile unit has dialed in, wherein the ringing voltage would act like someone was removing the receiver from the hook and replacing it thereby causing the equipment to automatically reset to normal. A controlling relay K307 controls the dialing pulsing tones and operates the selectors K325 and K112. Whenever the equipment is automatically seized, a slow release relay K308 operates to automatically reset the other relays back to normal upon releasing. Another slow releasing relay K309 causes the relay K328 to operate and reset K325 and pulse K326. The relay K312, when operated, supplies voltage to the transmitter off-on circuit. The relay K313 switches in the proper line finding panel, while the relay K314 switches from either the calling of the private line phone or the calling of another mobile or radiotelephone unit. The series connected resistor R4 and capacitor C3 between ground and the contacts K307*a* and K302*b*, and the series connected resistor R5 and capacitor C4 between ground and the contacts K306*c*, K307*c*, and K308*d* are arc-suppression tuned circuits. Similarly, the series connected capacitor C5 and resistor R7 between ground and the motor coil K326A of the selector 326 serves as an arc-suppression tuned circuit.

A slow-to-operate relay K315 operates only when the mobile unit operator replaces his receiver on the hook and pushes his press-to-talk switch which thereby transmits a steady tone of approximately three-quarters of a second that will hold voltage across the coil of relay K315 long enough to operate via the mobile tone receiver plate relay K402, FIG. 5. When the receiver is removed from the hook at the remote private line dispatch point, the pulsing of the relay K401, FIG. 5, is stopped by operation of the relay K305 thereby causing the sixty-cycle ringing voltage to stop.

Referring now to FIG. 5 which represents the panel for generating or receiving the tone signals, this panel generally comprises a tone receiver 92, a dialing tone amplifier 93, a dialing tone oscillator 94, the dialing tone oscillator and amplifier functioning to transmit the necessary tone pulses for signalling the mobile unit, the dial tone oscillator 95 serving to indicate when the equipment is cleared so the private line dispatch user may begin his dialing sequence, the busy tone oscillator 96 and the low frequency oscillator 97.

The tone receiver 92 is of a limiter-amplifier keying type single tone receiver and includes generally pentode vacuum tubes V5 and V6. The condensers C7 and C8 are direct current blocking condensers, while the condenser C9 serves to couple the input to the tone receiver 92. The input tone signal and the tone receiver 92 are tuned to the tuning circuit which includes the inductance L2 and the capacitor C10. The tone is then fed through the resistor R9 to the control grid of the amplifying tube V5. From the plate of the tube V5, the tone is carried through the tone filter network including the capacitors C14 and C15 and the inductances L3 and L4, and from there is fed to the control grid of the vacuum tube V6 through the resistor R12. This vacuum tube V6 serves as a special limiter-amplifier stage for triggering the relay K402. Since the incoming tone signal is not always constant, this limiter-amplifier stage V6 is vital in decoding the incoming keyed tones. The incoming tone signal varies considerably, depending upon whether the mobile unit is in motion, in a fringe area, or is supplying a strong radio frequency signal to the base station receiver. Heretofore, it was necessary to stop the mobile unit before dialing in. However, with the limiter-amplifier stage, dialing can be successfully accomplished at any time. The resistors R13, R14, and R15 and the capacitors C11, C16, and C17 are all connected into the limiter-amplifier stage around the vacuum tube V6 for the limiting action. And the relay K402, connected into the limiter-amplifier stage, functions to trigger the relay K307, FIG. 4. Below the relay K402, series connected resistor R16 and capacitor C18 function to suppress arcing in the relay contacts.

The dialing tone oscillator 94 includes a double unit triode vacuum tube V8 and serves to transmit the necessary tone pulses for signalling the mobile unit, etc. The resistors R20 and R26 bias the control grids while the resistor R23 serves to bias the cathodes of the vacuum tube V8. The resistors R21, R22, R24, and R25 serve to prevent the de-tuning and overloading of the oscillator stage. The parallel connected capacitor C22 and inductance L5 define a tuning circuit for tuning the oscillator stage and is connected across the plates of the tube, while feed back is provided by the capacitors C23 and C24 connected to the control grids and the tuned circuit.

The dialing tone from the oscillator is amplified by the dialing tone amplifier 93 which generally includes the double unit triode vacuum tube V7. The output of the tube V7 is taken from the plates and matched to the transmitter input terminal by means of the transformer T1. The capacitor C20 adjacent the transformer T1 serves to block direct current voltage and as a tone frequency coupling. The series connected capacitor C19 and potentiometer R17 leading to one of the control grids, and the series connected capacitor C21 and potentiometer R19 leading to the other control grid, and the resistor R18 connected to both of the cathodes of the vacuum tube provide a balanced network for this amplifier stage.

The dial tone oscillator 95 indicates when the equipment is clear and the private line dispatch user may begin his dialing sequence. This stage includes the double unit triode vacuum tube V13 and one-half of the double unit triode vacuum tube V12. The resistors R27 and R31 are connected to the plates of the vacuum tube V13 and serve as plate loading resistors. Also connected to the plates is an LC tuned circuit consisting of a condenser C25 and one half of the transformer T2 which also serves to couple the output of the vacuum tube V13 to the control grid in the right half of the amplifying tube V12. The capacitors C26 and C27 provide feed back through the control grids of the vacuum tube V13, while the control grids are biased by the resistors R28 and R30. Biasing of the cathodes of vacuum tube V13 is accomplished by the resistor R29. The resistor R32 between the transformer T2 and the control grid of the right half of the vacuum tube V12 serves as a voltage dropper and the potentiometer R33 leading to the control grid controls the gain on the right half of the tube V12. Biasing of the cathode of the right half of the vacuum tube V12 is accomplished by the resistor R34.

Generation of the busy tone is accomplished by the busy tone oscillator 96 which includes generally the double unit triode vacuum tube V11 serving as the oscillator and which is amplified by the left half of the vacuum tube V12. The output from the amplifying tube V12 is matched to the proper line for delivering the dial tone by the transformer T3, while the output of the plate for delivering the busy tone is accomplished by the transformer T4, both transformers of which also serve to load the plates of the vacuum tube V12. The tuning circuit for the oscillator tube V11 consists of one half of the transformer T5 and the capacitor C28 which is connected to the control grids of the tube through the feed back capacitors C29 and C30. The resistors R39 and R40 serve to load the plates of the tube V11. The control grids of the oscillator tube V11 are biased by the resistors R41 and R38. Between the transformer T5 and the grid of the left half of the vacuum tube V12, a voltage dropping resistor R37 and a variable gain control resistor R36 are provided, while the cathode of the left half of the vacuum tube V12 is biased by the resistor R35. The resistor R54 and the capacitor C31, connecting to the transformer T5, function as a pulse filter network.

The low frequency oscillator 97 includes the stage having the vacuum tube V9 and the pulsing stage that controls the pulsing of the busy tone oscillator 96 via the triggering vacuum tube V10 and the ringing voltage via the relay K401 The tube V9 is a double unit triode having the cathodes biased by the resistors R48 and R49, the grids biased by the resistors R47 and R50, and the plates loaded by the resistors R52 and R53. Between the grid bias resistors R47 and R50 and the grids of the vacuum tube V9 are variable resistors R46 and R51 which control the speed of pulsing. Feed back to the grids of the vacuum tube V9 is effected by the capacitors C33 and C34, while the direct current blocking condenser C32 also couples the pulsing of the vacuum tube V9 to the amplifying triode tube V10 through the voltage dropping resistor R45. The resistors R42, R43, and R44 are connected to the vacuum tube V10 and are of proper value for operation of this tube. The plate of the vacuum tube V12 is connected to the cathodes of the busy tone oscillating tube V11.

The transformer T6 has its primary connected to the 110 volt alternating current energy of the power supply, and through its secondary and the selenium rectifiers CR12 and CR13, supply the necessary bias voltage to the vacuum tubes V10 and V13. Bias voltage is also supplied to the stages including the vacuum tubes V9, V11, and V12 through the voltage dropping resistor R64Y.

Lifting of a receiver from the instrument installed at the private line sub-station 230 operates relay K110, FIG. 2, whose contacts K110*b* operate relay K306, FIG. 4, through the termination panels A2, 1C and D1. Contacts K110*c* open to prevent the busy signal from being impressed across the line 230. It is then seen that the relay K307 operates by being connected to ground through the closed contacts K302*b* and the now closed contacts K306*a* and K306*b*. Operation of the relay K307 operates the slow release relay K308 by closing of the contacts K307*b*. Opening of the contacts K307*c* prevents operation of the relay K309 when contacts K308*d* close. The lock out relay K114 is then operated by closing of the contacts K308*b* through the panels 1C and A2 and relay K114 places the interrupted busy signal on all of the lines other than the one being used, and opens the circuit to each line finding relay other than the relay K110 by opening of the contacts K114*a* and K114*b*. The closing of the contacts K114*d* impresses the interrupted busy tone signal from the busy tone oscillator 96, FIG. 5, on all of the other lines except the line being used, this signal coming through panels D1 and A2 and being generated by the busy tone oscillator 96 and the pulsing of relay K401. Closing of the contacts K114*c* directly connects the return circuit to the relay K110 and therefore holds that relay in operation during the conversation.

The relay K305 also operates immediately after the relay K306 operates wherein ground is connected to the relay K305 by the closing of the contacts K306*a*. Contacts K305*b* shunt out the tuned ring-back circuit L1, C6 and R8. Contacts K305*a* connect into the dial tone 95 through the terminal panels D1 and 1C and A2 to impress the dial tone on the instrument being connected to the line 230 of the panel 3A and ready the instrument for dialing. Contacts K305*c* and K305*d* connect ground to both sides of the resistor R48 and thereby take it out of the circuit in FIG. 5 to permit relay K401 to begin pulsing and generating of the interrupted busy tone for all lines except the line calling to indicate the equipment is in use. The relay K301 also operates upon operation of the relay K306 through the closing of contacts K306a, thereby opening contacts K301a and K301b. Opening of contacts K301b prevents shorting out of the dial tone oscillator 95 which will be shorted out when a call is initiated from a mobile or radio-telephone unit. However, it is necessary to be operated when a call is initiated from a private line sub-station.

Relay K202, FIG. 3, also operates upon the operation of relay K308 and the closure of contacts K308b. Closing of contacts K202a energizes the timer relay K206 which will open the contacts K206a only after a predetermined lapse of time, such as thirty seconds.

Closing of the contacts K308c effectively connects the rotating coil K325A of the selector K325 to the line 230 through the relay K306. Actually, the rotating coil K325A is now connected to the open contacts K307a whereby dialing causes pulsing of the relay K307 and closing of contacts K307a to connect the coil K325A to ground and pulse same to thereby actuate the selector K325. The system is now ready for dialing operation from the sub-station 230 to a mobile or radio-telephone unit.

For example, to make a call to car 455, the number four is dialed which steps up the arm 83 and the selector K325 to the fourth position. Because the present embodiment is shown operable with ten position selectors or stepping relays at the mobile or radio-telephone units, the sum of the last two digits of a number to such a unit will equal ten. The arm 83 steps up because the relays K306 and K307 pulse during the dialing operation to thereby pulse the rotating coil K325A by opening and closing of contacts K307a. Relay K308, being a slow release relay, will not operate during the pulsing caused in the dialing operation. At the first pulse during dialing the number four, the relay K309 will be energized by the closing of contacts K307c and since this is a slow release relay, it will not deenergize during the pulsing operation until the fourth position in the selector K325 is reached and then it will deenergize. But K309 will hold during the pulsing operation. So during the pulsing operation contacts K309a and K309b open to prevent respectively current from going through the arm 83 of the selector K325 and the operation of the relay K328 which operates the selector K326. After the selector arm 83 of the selector K325 is in the number four position and the relay K309 has released the relay K303 will be energized through the closed contacts K304a, the current now passing through the arm 83 because K309 has released. Opening of the contacts K303a prevents triggering of the relay K304 to thereby prevent relay K304 from operating during further dialing operation since closing of the contacts K303b holds relay K303 in energized position. Closing of the contacts K303d turns on the base station transmitter 74, while the closing of the contacts K303c connects in the dialing tone oscillator 94 through the terminal strips 1C and D1 to connect the cathode return circuit to ground through the relay K306. When the dialing arm 83 hits the number four position of the contacts 84 and the selector K325, the limiting switch 85, having closed upon the first pulsing of the rotating coil K325A, the relay K309 will release to pulse relay K328 and close the contacts K328a which pulses the rotating coil 326A of the selector K326 to step up the arms 88 and 90 to the number one positions on the contacts 89 and 91. Closing of the contacts K328a simultaneously operates the release coil K325B of the selector K325 to reset the arm 83 to its "home" position which thereby opens the limit switch 85. Relay K324 is operated by movement of the arm 90 of the selector K326 to the first position along the contacts 91. Closing of contacts K324a establishes a hold circuit for relay K324 when arm 90 advances from the first position while K324b connects into the dial tone oscillator 95 and acts as a dial tone cut-off relay to stop the dial tone from being heard after the first digit has been dialed. Dialing of the next digit five will step up the arms 83 and 86 to the number five position which closes the limit switch 85 and pulses the relay K307 and the cathode return of the dialing tone oscillator 94 to transmit five tone pulses to the mobile or radio-telephone units thereby stepping up the stepping relays in those units to the fifth position. After the fifth position has been reached by the selector K325, the relay K309 will again be released to actuate the relay K328 which again pulses the selector K326 to move the arms 88 and 90 up to its second position and to operate the release coil K325B of the selector K325 to release the selector K325 to its "home" position. Similarly, with another dialing operation of a digit five the same sequence of events will happen and thereby transmit five more tone pulses to the mobile or radio-telephone units. It will be understood that the usual ten position stepping relay will be carried by each mobile and radio-telephone unit, each of which is so connected into a signalling circuit that it is only operated if the proper sequence of tone pulses are received.

Relay K201 operates after the third and last number has been dialed and the selector arms 88 and 90 have reached the third position. Closing of the contacts K201a serves to connect in the balancing network resistor R3 for attenuating the incoming signal from the base station receiver back to the base station transmitter so that the signal to the base station transmitter is equal to the signal coming from the private line sub-station. Opening of the contacts K201b through the terminal strips B2 and B1 disconnects the tone receiver 92 from the system. Closing of the contacts K201c connects in the base station transmitter 74 and the base station receiver 75 to the private line sub-station 230 through the panels B2 and A2. Opening of the contacts K201d takes the resistor R48 of the low frequency oscillator 97 out of the circuit through the terminal strips B2 and D1. Two-way conversation can then be carried on between car 455 and the private line sub-station 230.

Pushing the press-to-talk button turns on the transmitter in a mobile unit and operates a squelch circuit in the base station receiver 75 which, in turn, operates the carrier operated relay K203, FIG. 3. Closing of the contacts K203c connects in the balancing circuit between the base station transmitter and the base station receiver. Opening of the contacts K203a breaks the circuit to the timer relay K206 so that it will return to its normal position without opening the contacts K206a. Should the timer relay K206 operate for a thirty second period and open the contacts K206a, the relay K307 will be released and the equipment will reset to normal through the now closed contacts K203b. After the conversation has been completed and the operator at the private line sub-station 230 replaces the receiver on the hook, the relays K306, K307, and K308 will release in sequence, whereby the relay K308 will reset the equipment to normal and ready it for further operation.

Also, upon replacing the receiver on the hook at the private line sub-station 230, the arms 88 and 90 will step up to the fourth position which will operate the release coil K326B and cause resetting of this selector K326 for further operation by returning the arms 88 and 90 to their "home" position.

In calling from a mobile or radio-telephone unit to a private line sub-station such as sub-station 230, the receiver is raised from the hook and the push-to-talk button is pressed to turn on the transmitter and turn off the receiver. Pushing of the press-to-talk button will also actuate the carrier operated relay K203 in a manner similar to that already explained wherein closing of the contacts K203B, through the terminal strips B2, D1 and 1C operates the relay K307. Closing of contacts K307B operates the relay K308 by closing of the contacts K307B. Dialing of the first number at the dialing assembly of the mobile unit, in this case the number 2, triggers relay K402 through the tone receiver 92 which in turn pulses relay K307 causing relay K309 to pull down and hold since this is a slow release relay, which will in turn operate the arms 83 and 86 on the selector K325 and step them up to the second position, thereby automatically closing the limiting switch 85. Relay K204 pulses when relay K402 pulses thereby pulsing relay K307. Through the second position of the contacts 84 in the selector K325, the relay K314 will operate after the relay K309 releases. Relay K328 will release when relay K309 releases thereby operating the release coil K325B to reset the arm 83 of the selector K325 to its "home" position. Triggering of the relay K328 will also step up the selector K326 so that the selector arms 88 and 90 are in the number one position. Opening of contacts K314*c* and closing of contacts K314*d* switches the operation from the contacts 84 of the selector K325 to the contacts 87. Contacts K314*a* operate as a holding circuit for the relay K314, while the contacts K314*b* connect in the second position of contacts 91 on the selector K326 to the relay K313 so that it may operate after the second number has been dialed. Dialing of the second number 3 pulses the selector K325 and advances the arm 86 to the third position which through the terminal strips 1C and A2 operates the bank relay K113, FIG. 2. Of course, it will be appreciated that only one bank relay is shown for simplicity, although ten banks may be employed in as many positions as shown on the stepping relays of selector K325. Closing of the contacts K113*a* serves to connect into the equipment the selector K112, FIG. 2, for the dialing of the third digit, while contacts K113*b* operate the lock out relay K114 which places the busy signal on all of the other lines and opens the circuit to each line finding relay. Advancing the selector arm 90 of the selector K326 to the second position operates the relay K313 through the closed contacts K314*b*. Relay K313 connects in the rotary coil K112*a* of the selector K112. Then with the third number zero dialed, the selector arm 80 of the selector K112 will step up to the zero position and which will advance the selector arms of the selector K325 thereby causing operation of the relay K328 and advancing of the selector arm 90 of the selector K326 to the third position. Connecting the arm 90 to the third position will operate the relay K111 which will connect by operation of the relay K312 the base station transmitter into line 230 and connect in the ringing voltage to start the ringing only for ringing the instrument at the line 230. Upon removing the receiver from the hook on the instrument at 230, the ringing will stop due to operation of relay K305, and the two-way conversation may be commenced. Removing the receiver from the hook at 230 operates relay 305 and 306 and thereby transfers control of the system to the instrument at the private line sub-station 230. When the operator at the private line sub-station 230 replaces the receiver on the hook, the equipment will reset to normal for the next operation.

Should a party call in from a mobile or radio-telephone unit and get a wrong number or no number at all and desire to try again, he may immediately reset the equipment by placing his receiver on the hook and pressing his press-to-talk switch thereby transmitting a steady tone of a predetermined time, such as ¾ of a second, which will hold relay K402 in operated position long enough to hold voltage across the slow-to-operate relay K315 and operate same. Closing of contacts K315*a* connects one side of relay K302 to ground and closing of contacts K315*b* connects the other side of relay K302 to the 48 volt direct current supply to operate same. Operation of relay K302 opens contacts K302*b* to release relays K307 and K308 while holding relays K301 and K305. When the transmitter is turned off by releasing the press-to-talk switch, the equipment will completely reset to normal. Hence, it is only necessary to wait a few seconds rather than to wait out operation of the thirty second timer relay K206. Similarly, should interference trigger the transmitter to advance the stepping arms on selector K326 to the third position before one is ready to complete a call, the equipment may quickly be reset to normal. Therefore, it is seen that the equipment may be reset to normal by remote control through the relay K315 prior to it being done automatically.

When making a call from one mobile or radio-telephone unit to another mobile or radio-telephone unit, the receiver at one unit is removed from its hook and the push-to-talk switch is actuated to operate the squelch circuit which, in turn, actuates the carrier operated relay K203. Relay K307 is operated upon operation of relay K203 and thereby operates relay K308. Relay K202 operates when relay K308 is operated. For example, in dialing car 455 from another mobile unit, the prefix 6 is used instead of 4 as in the case of being dialed from a private line phone. The number 655 is dialed and the digit six is dialed first which pulses relay K402 and operates relay K204 through the tone receiver 92 which, in turn, pulses relay K307 causing relay K309 to pull down and hold and pulse the rotating coil K325A to step up the arms 83 and 86 to the sixth position. Closing of contacts K204*a* holds relay K204. When the sixth position is reached by the selector arms 83 and 86, the relay K309 will release and the relay K304 will be energized through the closed contacts K303*a*. Relay K304 will hold by the closing of contacts K304*b*, and opening of contacts K304*a* prevents triggering of relay K303 during further dialing operation. The base station transmitter 74 is turned on by the closing of contacts K304*c*. Also upon release of relay K309, the relay K328 will be pulsed to pulse the rotating coil 326A and advance the stepping arms 88 and 90 to the first position. Simultaneously, closing of the contacts K328*a* will operate the release coil K325B to reset the stepping arms 83 and 86 to their "home" position. Relay K324 is operated as the stepping arm 90 reaches the first position to stop the dial tone thereby indicating to a user at a private line dispatch point that the channel is busy. Dialing of the next digit five pulses the relays K402 and K307 and the cathode return of the dialing tone oscillator 94 to transmit five tone pulses to all mobile and radio-telephone units thereby stepping up the stepping relays in each unit to the fifth position. However, only the stepping relay in car 455 will hold, while the others will automatically "home." After the fifth position has been reached by the arms of the selector K325, the relay K309 will again release and operate the relay K328 to pulse the selector K326 and move the arms 88 and 90 to the second position. The release coil K325B will also operate to "home" the selector arms 83 and 86 of the selector K325. Similarly, with another dialing operation of a digit five, the same sequence of events will take place and thereby transmit five more tone pulses to all mobile and radio telephone units, whereby the stepping arm of the stepping relay in car 455 will step up to the tenth position to operate a signalling circuit in the apparatus of car 455 and indicate he is being called. In the termination equipment, reaching of the third position by the selector arm 90 of selector K326 operates relay K201 which, in turn, connects the balancing network between the base station transmitter and the base station receiver, disconnects the tone receiver from the system, takes the resistor R48 out of the circuit, and connects the base station receiver 75 to the base station transmitter 74. Push-to-talk communication can then be carried on between the car 455 and the calling unit. The carrier operated relay K203 will be operated by the unit which has its press-to-talk switch operated as before explained. At the conclusion of the conversation, and replacing of the receivers on the hooks, the equipment will automatically reset to normal by operation of the timer relay K206 after a thirty second period or a predetermined time interval, if the carrier operated relay K203 is not actuated within that time. Further, the termination equipment will return to normal by the operation of relay K315 which is controlled by the mobile operator.

It will be understood that modifications and variations may be effected without departing from the scope of the novel concepts of the present invention, but it is understood that this application is to be limited only by the scope of the appended claims.

The invention is hereby claimed as follows.

1. An automatic radio-telephone system adapted to provide fully dial-operated two-way communication between any one of a plurality of private line dispatch points and any one of a plurality of mobile and radio-telephone units comprising, a termination equipment, radio equipment including a normally-off base station transmitter and a normally-on base station receiver coupled to said termination equipment, said private line dispatch points being coupled to said termination equipment, a dial tone oscillator for generating a dial tone, means for coupling said dial tone oscillator to any private line dispatch point to indicate when the equipment is not in use, a busy tone oscillator for generating a pulsating busy tone, means for impressing the pulsating busy tone on all private line dispatch points except the one in use upon lifting a receiver from a telephone unit at one of the private line dispatch points not in use, a dialing tone oscillator for generating a dialing tone, means for coupling the dialing tone oscillator to said base station transmitter for transmitting dialing pulses to all mobile and radio telephone units upon dialing a predetermined digit from a private line dispatch point, means connecting in a balancing network for attenuating the incoming audio signal to the base station receiver after the last number has been dialed, and means for connecting said base station transmitter and said base station receiver to any private line dispatch point to communicate with any mobile or radio-telephone unit.

2. An automatic radio-telephone system adapted to provide fully dial-operated two-way communication between any one of a plurality of private line dispatch points and any one of a plurality of mobile and radio-telephone units comprising, a termination equipment, radio equipment including a normally-off base station transmitter and a normally-on base station receiver coupled to said termination equipment, said private line dispatch points being coupled to said termination equipment, said termination equipment including a dial tone oscillator for generating a dial tone, means for coupling said dial tone oscillator to any private line dispatch point to indicate when the equipment is not in use, a busy tone oscillator for generating a pulsating busy tone, means for impressing the pulsating busy tone on all private line dispatch points except the one in use upon lifting a receiver from a telephone unit at one of the private line dispatch points not in use, a dialing tone oscillator for generating a dialing tone, means for coupling the dialing tone oscillator to said base station transmitter for transmitting dialing pulses to all mobile and radio-telephone units upon dialing a predetermined digit from a private line dispatch point, a balancing network, means for connecting in said balancing network between the base station transmitter and the base station receiver to alternate the audio signal from the base station receiver back to the base station transmitter thereby equalizing the signal with the average incoming signal from the private lines, and means for connecting said base station transmitter and said base station receiver to any private line dispatch point to communicate with any mobile or radio-telephone unit.

3. An automatic radio-telephone system adapted to provide fully dial-operated two-way communication between any one of a plurality of private line dispatch points and any one of a plurality of mobile and radio-telephone units comprising, a termination equipment, radio equipment including a normally-off base station transmitter and a normally-on base station receiver coupled to said termination equipment, said private line dispatch points being coupled to said termination equipment, said termination equipment including a dial tone oscillator for generating a dial tone, means for coupling said dial tone oscillator to any private line dispatch point to indicate when the equipment is not in use, a busy tone oscillator for generating a pulsating busy tone, means for impressing the pulsating busy tone on all private line dispatch points except the one in use upon lifting a receiver from a telephone unit at one of the private line dispatch points not in use, a dialing tone oscillator for generating a dialing tone, means for coupling the dialing tone oscillator to said base station transmitter for transmitting dialing pulses to all mobile and radio-telephone units upon dialing a predetermined digit from a private line dispatch point, a balancing network, means operative after the last digit is dialed for connecting in said balancing network between the base station receiver and the base station transmitter to attenuate the audio signal from the base station receiver back to the base station transmitter thereby equalizing the signal with the average incoming signal from the private line dispatch points, and means for connecting said base station transmitter and said base station receiver to any private line dispatch point to communicate with any mobile or radio-telephone unit.

4. An automatic radio-telephone system adapted to provide fully dial-operated two-way communication between any one of a plurality of mobile and radio-telephone units and any one of a plurality of private line sub-stations comprising, a termination equipment, radio equipment including a normally-on base station receiver and a normally-off base station transmitter coupled to said termination equipment, said private line sub-stations being connected to said termination equipment, said termination equipment including, means for receiving and decoding tone pulses transmitted from the mobile and radio-telephone units when these units dial in, said means including a limiter-amplifier stage permitting dialing from a mobile unit in motion and rendering said tone receiving means operative in response to a tone signal of varying strength, and means for ringing the dialed private line sub-station.

5. An automatic radio-telephone system adapted to provide fully dial-operated two-way communication between several mobile and radio-telephone units comprising, a termination equipment, radio equipment including a normally-on base station receiver and a normally-off base station transmitter coupled to said termination equipment, said termination equipment including, means for receiving and decoding tone pulses transmitted from a mobile or radio-telephone unit, and means for turning on the base station transmitter and coupling it to said receiving and decoding means so that dialing pulses transmitted from one mobile or radio-telephone unit will be transmitted from the base station transmitter to all mobile and radio-telephone units and means for connecting in a balancing network between the base station transmitter and the base station receiver to attenuate the signal from the base station receiver back to the base station transmitter.

6. An automatic radio-telephone system adapted to provide fully dial-operated two-way communication between several mobile and radio-telephone units comprising, a termination equipment, radio equipment including a normally-on base station receiver and a normally-off base station transmitter coupled to said termination equipment, said termination equipment including, means for receiving and decoding tone pulses transmitted from a mobile or radio-telephone unit, and means for turning on the base station transmitter and coupling it to said receiving and decoding means so that dialing pulses transmitted from one mobile or radio-telephone unit will be transmitted from the base station transmitter to all mobile and radio-telephone units, said receiving and decoding means having a limiter amplifier stage permitting triggering of said means even when the incoming signal is not constant.

7. An automatic radio-telephone system adapted to provide fully dial-operated two-way communication between several mobile and radio-telephone units comprising, a termination equipment, radio equipment including a normally-on base station receiver and a normally-off base station transmitter coupled to said termination equipment, said termination equipment including, a tone receiver for receiving and decoding tone pulses transmitted from a mobile or radio telephone unit, means for turning on said base station transmitter upon dialing of a certain digit by a mobile or radio-telephone unit, a dialing tone generator, means for energizing said generator upon further dialing operation to transmit tone pulses to all mobile and radio-telephone units, and means for coupling said base station transmitter and said base station receiver together and connecting a balancing network therebetween to equalize the signal.

8. An automatic radio-telephone system adapted to provide fully dial-operated two-way communication between several mobile and radio-telephone units comprising, a termination equipment, radio equipment including a normally-on base station receiver and a normally-off base station transmitter coupled to said termination equipment, said termination equipment including, a tone receiver for receiving and decoding tone pulses transmitted from a mobile or radio-telephone unit, means for turning on said base station transmitter upon dialing of a certain digit by a mobile or radio-telephone unit, a dialing tone generator, means for energizing said generator upon further dialing operation to transmit tone pulses to all mobile and radio-telephone units, and means for coupling said base station transmitter and said base station receiver together and connecting a balancing network therebetween to equalize the signal, and means for automatically resetting the termination equipment to normal upon lapse of a predetermined period of time after the call has been completed.

9. An automatic radio-telephone system adapted to provide fully dial-operated two-way communication between several mobile and radio-telephone units comprising, a termination equipment, radio equipment including a normally-on base station receiver and a normally-off base station transmitter coupled to said termination equipment, said termination equipment including, a tone receiver for receiving and decoding tone pulses transmitted from a mobile or radio telephone unit, means for turning on said base station transmitter upon dialing of a certain digit by a mobile or radio-telephone unit, a dialing tone generator, means for energizing said generator upon further dialing operation to transmit tone pulses to all mobile and radio-telephone units, and means for coupling said base station transmitter and said base station receiver together and connecting a balancing network therebetween to equalize the signal, and means for resetting the termination equipment to normal within a short time interval by remote control if desired by the mobile or radio-telephone user.

References Cited in the file of this patent

UNITED STATES PATENTS

| | | |
|---|---|---|
| 1,619,228 | Williams, Jr. et al. | Mar. 1, 1927 |
| 2,129,332 | Mastini | Sept. 6, 1938 |
| 2,530,815 | Dimmer | Nov. 21, 1950 |
| 2,575,782 | Bartelink | Nov. 20, 1951 |
| 2,616,032 | Herrick | Oct. 28, 1952 |
| 2,731,554 | Eckmann et al. | Jan. 17, 1956 |
| 2,859,338 | Poluka | Nov. 4, 1958 |
| 2,894,121 | Phillips | July 7, 1959 |

FOREIGN PATENTS

| | | |
|---|---|---|
| 80,088 | Denmark | Nov. 7, 1955 |